(12) United States Patent
Kotani et al.

(10) Patent No.: US 7,813,577 B2
(45) Date of Patent: Oct. 12, 2010

(54) IMAGE EDITING APPARATUS AND IMAGE EDITING METHOD

(75) Inventors: Takuya Kotani, Tokyo (JP); Kunihiro Yamamoto, Kawasaki (JP); Naoki Matsuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1146 days.

(21) Appl. No.: 11/275,697

(22) Filed: Jan. 25, 2006

(65) Prior Publication Data

US 2006/0170704 A1 Aug. 3, 2006

(30) Foreign Application Priority Data

Jan. 28, 2005 (JP) ............................. 2005-021826

(51) Int. Cl.
*G06K 9/40* (2006.01)
(52) U.S. Cl. ................. 382/254; 382/260; 382/274; 382/275; 358/3.26; 358/3.27; 358/463
(58) Field of Classification Search ................. 382/255, 382/260, 274, 275
See application file for complete search history.

(56) References Cited

U.S. PATENT DOCUMENTS

| 5,886,898 | A  | * | 3/1999 | Choudhury et al. ......... 700/218 |
| 6,356,357 | B1 | * | 3/2002 | Anderson et al. .......... 358/1.17 |
| 6,427,020 | B1 | * | 7/2002 | Rhoads ...................... 382/100 |
| 6,885,478 | B1 | * | 4/2005 | Salgado et al. .............. 358/449 |
| 6,913,200 | B2 | * | 7/2005 | Sillman et al. ......... 235/462.15 |

OTHER PUBLICATIONS

"Digital Word Dictionary," obtained from online search Dec. 1, 2004, from <URL:http//www.nifty.com/webapp/digitalword/word/080/08091.htm>, © 2003.

* cited by examiner

*Primary Examiner*—Yosef Kassa
(74) *Attorney, Agent, or Firm*—Fitzpatrick, Cella, Harper & Scinto

(57) ABSTRACT

Modified image data is composed by combining unprocessed original image data and modification information expressing a modification process applied to that original image data, enabling the original image data to be recreated from modified image data without deterioration in picture quality. In addition, recording modification information at each process step enables past modifications to be undone and redone at any time.

19 Claims, 14 Drawing Sheets

IMAGE EDITING APPARATUS AND IMAGE EDITING METHOD

FIELD OF THE INVENTION

The present invention relates to an image editing apparatus and an image editing method.

BACKGROUND OF THE INVENTION

An inherent problem of the single-lens reflex digital camera, due to its structure, is that, unlike the lens-integrated type in which the lens cannot be changed, an image sensing unit composed of an image sensor and the like is exposed to the outside air. As a result, dust adheres to the low-pass filter and the like on the image sensor such as a CCD or a CMOS, resulting in the sensing of images in which the dust is evident.

In order to solve this sort of "dust problem", hardware countermeasures that physically reduce dust and prevent the appearance of dust are of course important. However, at present, support using a software application (a PC application) is required for the retouching of an image in which dust appears when the image is sensed with a camera for which such hardware countermeasures are not taken.

There are two possible methods of solving the problem of dust by retouching the image using a PC application: Automatic dust reduction using image analysis, and area reproduction. The former method reduces dust by identifying the location of dust from the image and replacing the pixels of dust with pixels obtained by predicting what should have been sensed if dust had not existed. The latter method eliminates dust by blending pixel values from other areas into the areas in which dust appears (dust areas). With the latter method, a user of the PC application can manually remove dust by specifying a copy source area (an area of the same or similar color tone as the dust areas) and a copy destination area (the dust areas).

The automatic dust reduction method is a PC application-based automatic process and thus the user's operation is easy. However, the image analysis process is complicated and requires an image for the purpose of detecting the dust areas and the like, and moreover, there is a risk of picture quality deterioration and the like due to mistaken identification. On the other hand, the area reproduction process requires the user of the PC application to specify the areas manually, and therefore, more user's operations than those required in the automatic dust reduction method are required, however, the output results match the intentions of the application user.

The area reproduction process is a commonly equipped function of an image modification PC application typified by Adobe PhotoShop®. The area reproduction process is described, for example, as the "copy stamp" function described under the entry "copy stamp" in the "digital word dictionary" [online search Dec. 1, 2004] at the following internet address: <URL:http://www.nifty.com/webapp/digitalword/word/080/08091.htm>.

However, an ordinary image editing PC application can save an image obtained by editing the original image (edited image) either by replacing (discarding) the original image or as a new file while the original image data being intact. Therefore, once the edited image is saved, if the user then wishes to undo or change the edit operations applied to the image, the user has no choice but to either redo the editing from the beginning using the original image or close one's eyes to a certain deterioration in the quality of the image and apply a further modify to the modified image. In addition, where a plurality of substantially identical cuts are present, as with commercial image sensing and the like, it is necessary to specify the contents of the modification process for each cut to which it is to be applied, which is time-consuming and inconvenient.

SUMMARY OF THE INVENTION

The present invention has as its object to solve these sorts of problems of the conventional art.

According to an aspect of the present invention, there is provided an image editing apparatus capable of applying a modification process specified by a user to original image data, the image editing apparatus comprising: image processing means that applies the modification process to the original image data and outputs modified image data; display means that displays to the user the image data that the image processing means outputs as results of the modification process; process step information storage means that stores process step information that expresses the order and content of the modification process applied to the original image data with each application of the modification process; and save means that saves the original image data as well as data containing the process step information relating to the original image data as modified image data.

According to another aspect of the present invention, there is provided an image editing apparatus comprising: read-out means that reads out modification information from first image data that includes original image data and process step information expressing the order and content of a modification process applied to the original image data; and attaching means that attaches the read-out modification information to second image data to which the same modification process as applied to the first image data is to be applied as modification information relating to the second image data.

According to a further aspect of the present invention, there is provided an image editing apparatus comprising: read-out means that reads out rotation information from first image data that includes image data and rotation information expressing the content of a rotation process to be applied to such image data; and display means that displays second image data to a user after first image data rotation processed according to the rotation information, a rotation process being performed on the second image data according to the rotation information of the first image data, the display means displaying the second image data in the same position as the first image data.

According to yet further aspect of the present invention, there is provided an image editing method capable of applying a modification process specified by a user to original image data, the image editing method comprising: an image processing step of applying the modification process to the original image data and outputting modified image data; a display step of displaying to the user the image data that the image processing step outputs as results of the modification process; a process step information storage step of storing process step information that expresses the order and content of the modification process applied to the original image data with each application of the modification process; and a save step of saving the original image data as well as data containing the process step information relating to the original image data as modified image data.

Other objects and advantages besides those discussed above will be apparent to those skilled in the art from the description of preferred embodiment of the invention which follows. In the description, reference is made to the accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

With such a structure, the image editing apparatus of the present invention enables recovery of the original image from the image data saved after modification, and moreover, enables execution of an efficient modification process in a case in which the same modification is to be applied to a plurality of images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
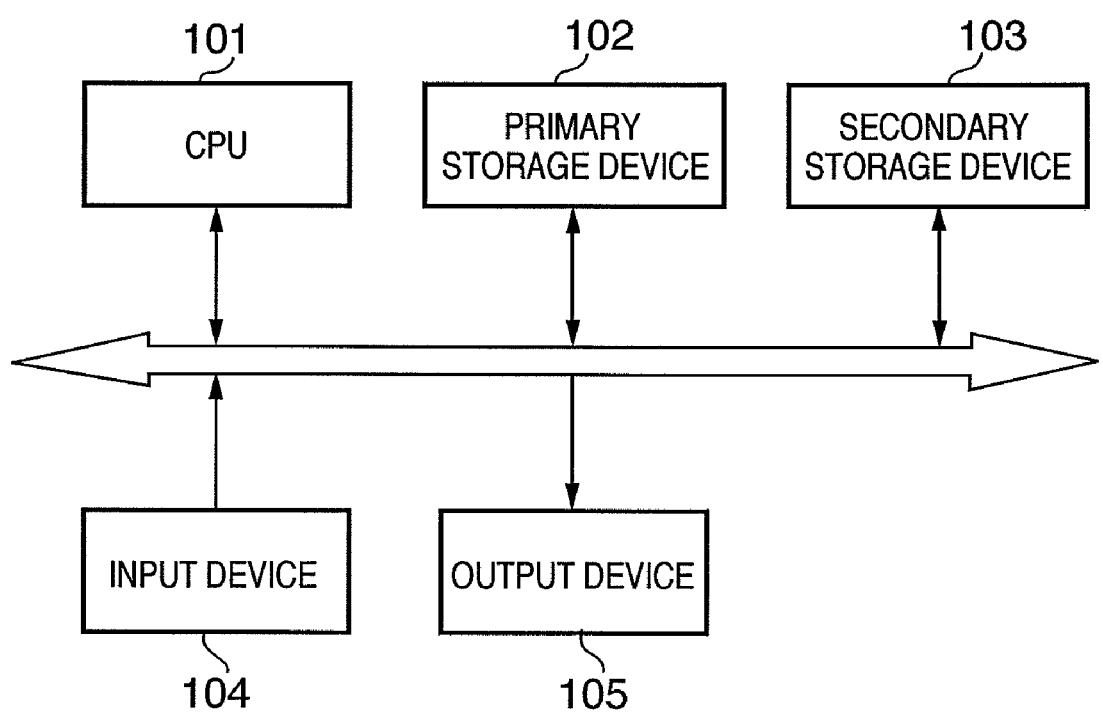
FIG. 1 is a diagram illustrating an example of a configuration of a computer system capable of functioning as an image editing apparatus according to an embodiment of the present invention.

FIG. 1 is a diagram showing a schematic configurational example of an ordinary computer system capable of functioning as an image editing apparatus according to a first embodiment of the present invention. A CPU 101 controls the operation of the entire system, and executes programs stored in a primary storage device 102. The primary storage device 102 is mainly a semiconductor memory, and reads and stores programs and the like stored in a secondary storage device 103. The secondary storage device 103 may be, for example, a hard disk.

In general, in a computer system, the capacity of the primary storage device is smaller than the capacity of the secondary storage device, and therefore programs and data that cannot be stored in the primary storage device are stored in the secondary storage device. In addition, data that must be stored over a long period of time and the like is also stored in the secondary storage device. In the present embodiment, the program that the CPU 101 executes so as to cause the system to function as the image editing apparatus of the present embodiment is stored in the secondary storage device 103, and when the program is executed, the program is read to the primary storage device 102 and executed by the CPU 101. An input device 104 may be, for example, besides a mouse or keyboard for the user to input instructions to the system, a memory card reader required to input image data, a scanner, a film scanner or the like. An output device 105 may be, for example, a monitor or a printer. It should be noted that, although a variety of other forms for the configuration of the system are conceivable, this matter is not the main point of the present invention and therefore a description thereof is omitted herein.

An operating system (OS) capable of executing a plurality of application programs in parallel is installed in the image editing apparatus according to the present embodiment, enabling the user to use application programs that run on the apparatus through a GUI (Graphical User Interface) provided by the OS. For example, in the present embodiment, Microsoft Windows® is used as the operating system. Therefore, although the following description proceeds on the basis of the specifications for Windows®, the implementing environment for the present invention is not limited thereby, and it is to be understood that the present invention can be adapted to other OS environments.

In addition, although there is no particular restriction on the types of image modification processes that can be executed by the image editing apparatus according to the present invention, the following description uses the example of the area reproduction process described in the conventional art.

Figure 2:
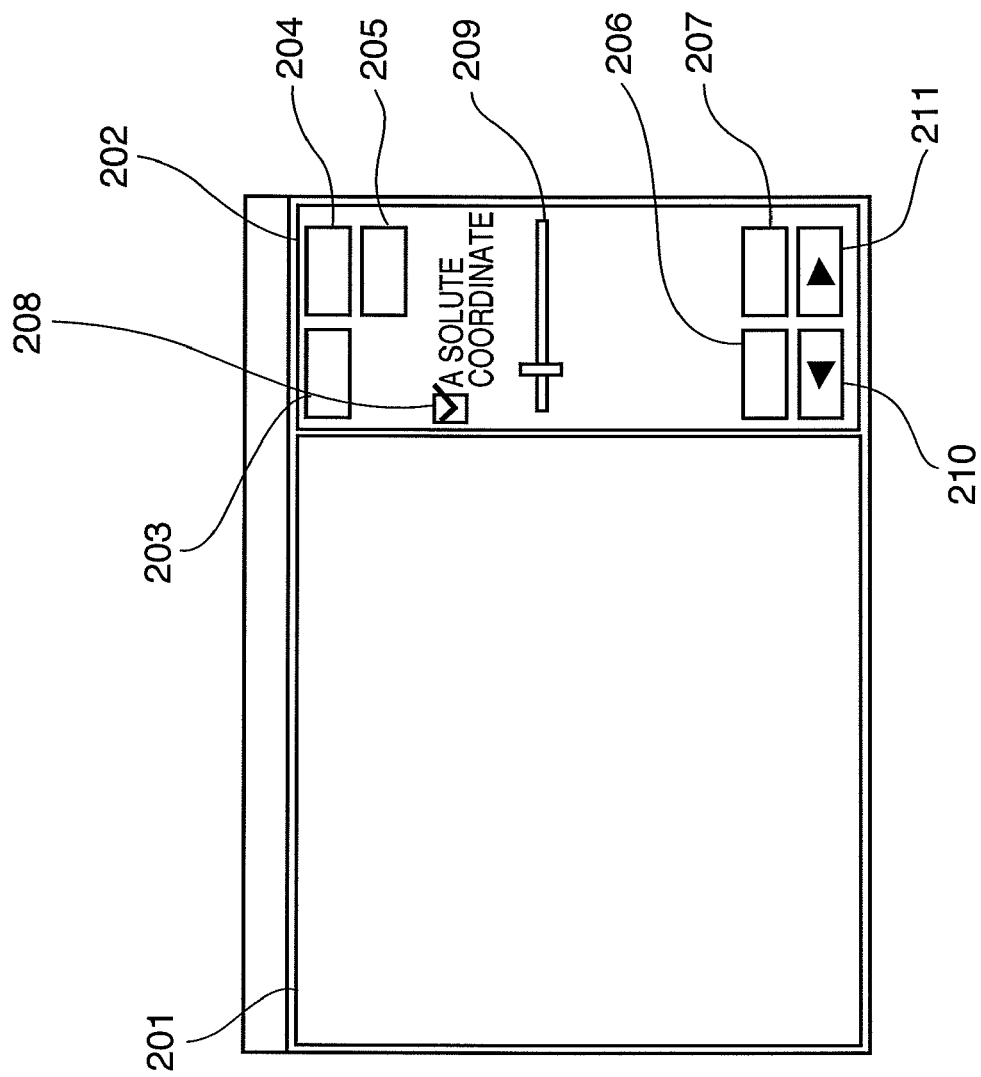
FIG. 2 is a diagram illustrating an example of a GUI that the image editing apparatus according to the embodiment of the present invention shows during area reproduction.

FIG. 2 is a diagram illustrating an example of a GUI that the image editing apparatus according to the embodiment of the present invention provides during area reproduction. An image to be modified is displayed in an image display area 201. A palette 202 for changing display settings and modification parameters is provided with the following buttons: A copy source position specification mode button 203, a display mode shift button 204, a full-screen display switch button 205, a copy source coordinates specification check button 208 that indicates whether the copy source coordinates are to be treated as absolute coordinates or as relative coordinates, a radius slider 209 that specifies the radius of a blend area, a previous selection button 210 and a next selection button 211 that select a "previous image" and a "next image" in a case in which a plurality of images to be modified is present. In addition, a save button 206 attaches a modification information stack (an aggregation of process step information stored each time a modification process is applied, showing the content of the modification process applied to the original image data; a history of operations) to the image to be modified. A convert button 207 outputs to a monitor or a printer the image after application of the modification information stack.

Figure 3:
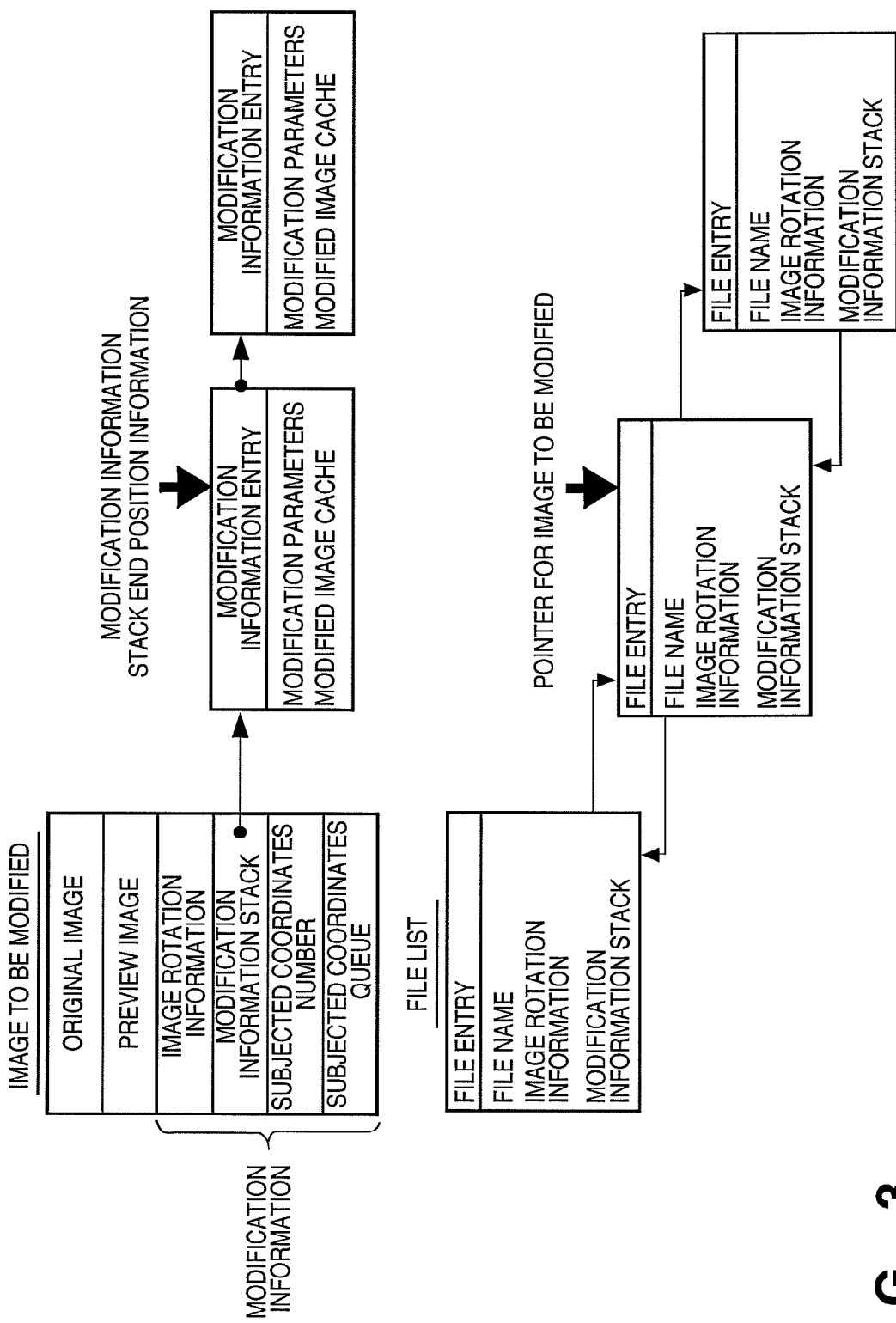
FIG. 3 is a diagram showing data that the image editing apparatus according to the embodiment of the present invention handles during area reproduction.

FIG. 3 is a diagram showing data that the image editing apparatus according to the embodiment of the present invention handles during area reproduction. All the images to be modified are registered in a file list. The file entries that comprise the file list have the file name, image rotation information and modification information stack of each image. Moreover, there is an image to be modified pointer that indicates the image to be modified, and the file that corresponds to the file entry referenced by the pointer is the image to be modified.

In addition, as image to be modified data, there is original image data of the image in an unmodified state and preview image data after modifications contained in the modification information stack to be described later are applied to the image. The image data in an unmodified state is retained for an Undo/Redo process to be described later. Although in FIG. 3 the modification information stack of the image to be modified and the modification information stack of the file entry are expressed as separate data, alternatively the modification information stack of the file entry may be directly referenced from the image to be modified data. In the present embodiment, the file entry modification information stack is referenced directly.

In addition, coordinates reported from the OS attendant upon a drag operation are stored in an arrangement called a subjected coordinates queue in order to permit a plurality of area reproduction processes produced by a single drag operation to be recorded in a single modification information stack. The number of coordinates stored is retained as a subjected coordinates number. Therefore, at the time an area reproduction process is commenced it is necessary to initialize the subjected coordinates number to 0.

In each of the modification information entries that comprise the modification information stack, there are modification parameters and a modification image cache.

The modification parameters are information indicating which modification processes have been applied to which coordinates. In the present embodiment, no ID for identifying the modification process is retained because the only modification process carried out is area reproduction. However, it goes without saying that an ID that identifies the modification process may be supplied as a constituent element of the modification parameter. The modification parameters in this embodiment are a radius r indicating the area reproduction process range, the subjected coordinates queue and the subjected coordinates number.

The modified image cache is the difference between the image before and after the image modification process recorded in the modification information entry is applied. Retaining this sort of cache enables modification to be executed at a speed higher than that of actual modification execution. This cache is utilized during Undo/Redo.

The image editing program of the present embodiment has image rotation information as image modification information other than the modification information stack. As for the direction of rotation of the image, although there are instances in which the image data itself is rotated, there are also instances in which the appropriate image rotation direction is saved by supplying information indication the direction of rotation of the image, as typified by an Exif (Exchangeable image file format for Digital Still Cameras) Orientation tag. In the latter instance, the image data itself is not changed, and therefore there is no deterioration in picture quality due to decoding for rotation, and thus this method can also accommodate special image data formats such as CCD-RAW data.

Accordingly, in the present embodiment, image rotation information indicating the direction of rotation of the image is applied to the image data together with the modification information stack and the image rotation result is retained. In the present embodiment, for example, the image may be rotated 90 degrees to the left by simultaneously pressing the keyboard Ctrl key and the L key, and the image may be rotated 90 degrees to the right by simultaneously pressing the Ctrl key and the R key. The way the image rotation information and the modification information stack are saved and the format of the data are described later.

Figure 4:
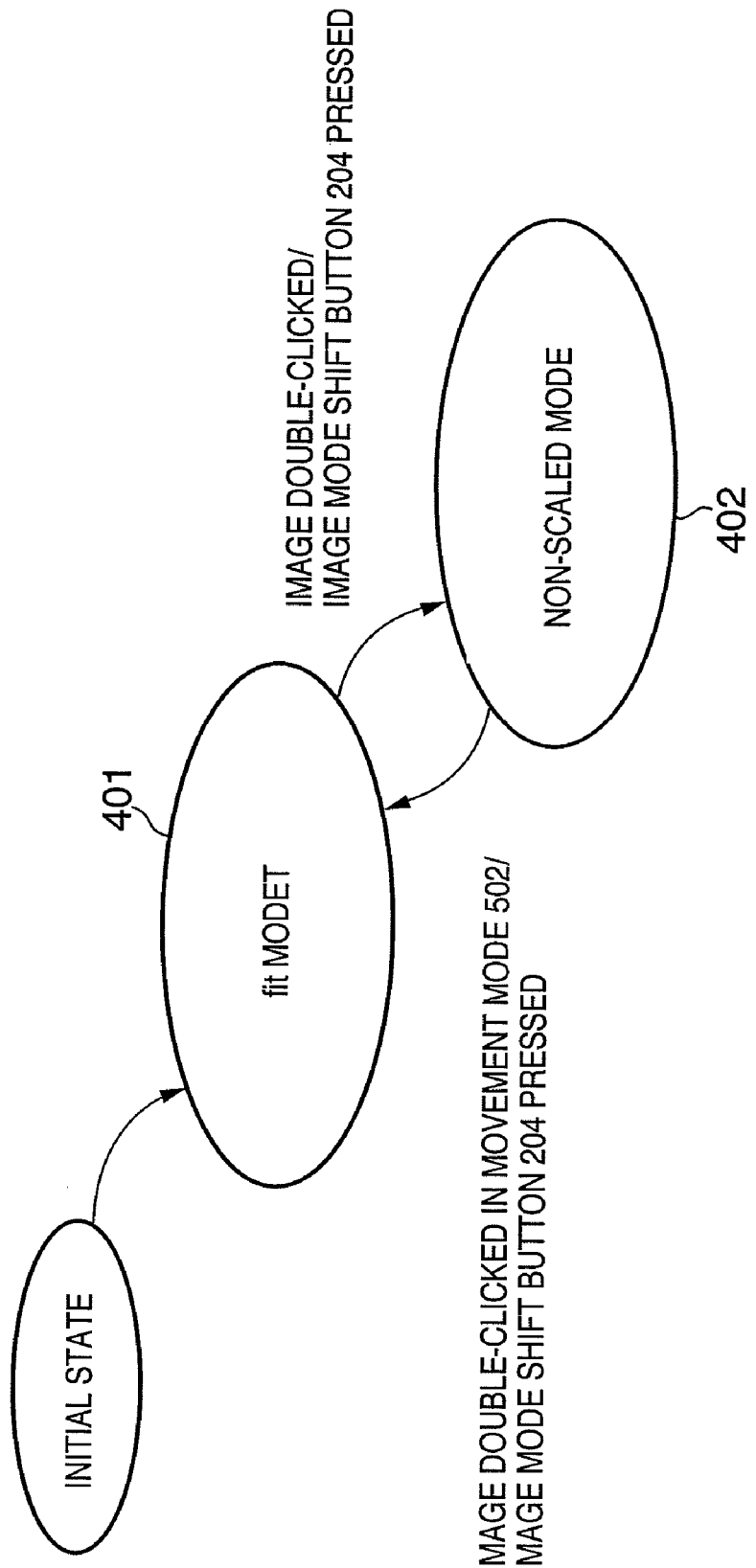
FIG. 4 is a diagram showing a shift between states of the GUI that the image editing apparatus according to the embodiment of the present invention shows.

FIG. 4 is a diagram showing a shift between states of the GUI that the image editing apparatus according to the present embodiment displays on the display device 105 as a display apparatus.

The GUI is divided between two modes, a fit mode 401 that displays the image at a scale sized to fit the size of the window and a non-scaled mode 402 that displays the image in a non-scaled display. The GUI shifts between these two states by a shift command. In this embodiment, image modification is prohibited in the fit mode, and enabled only in the non-scaled display mode. This arrangement is necessitated by the fact that, as the range through which image modification is executed widens, the data size of the modified image cache that represents the difference between the image before modification and the image after modification increases and the memory required for processing becomes very large. Limiting the image modification operation of the non-scaled mode limits the image modification range and allows the increase in the amount of memory used to be restrained.

In the fit mode, only shifting to the non-scaled mode is possible. In the present embodiment, the image editing apparatus shifts to the non-scaled mode when the display mode shift button 204 is pressed or when some part of the image that is fit-displayed in the image display area 201 is double-clicked. If the display mode shift button 204 is pressed, the image editing apparatus displays the center of the image to be modified in non-scaled display and shifts to the non-scaled mode. If the fit-displayed image is double-clicked, the non-scaled display is such that the double-clicked image position is displayed at the center of the screen. In non-scaled display, the area outside the image is blacked out.

Figure 5:
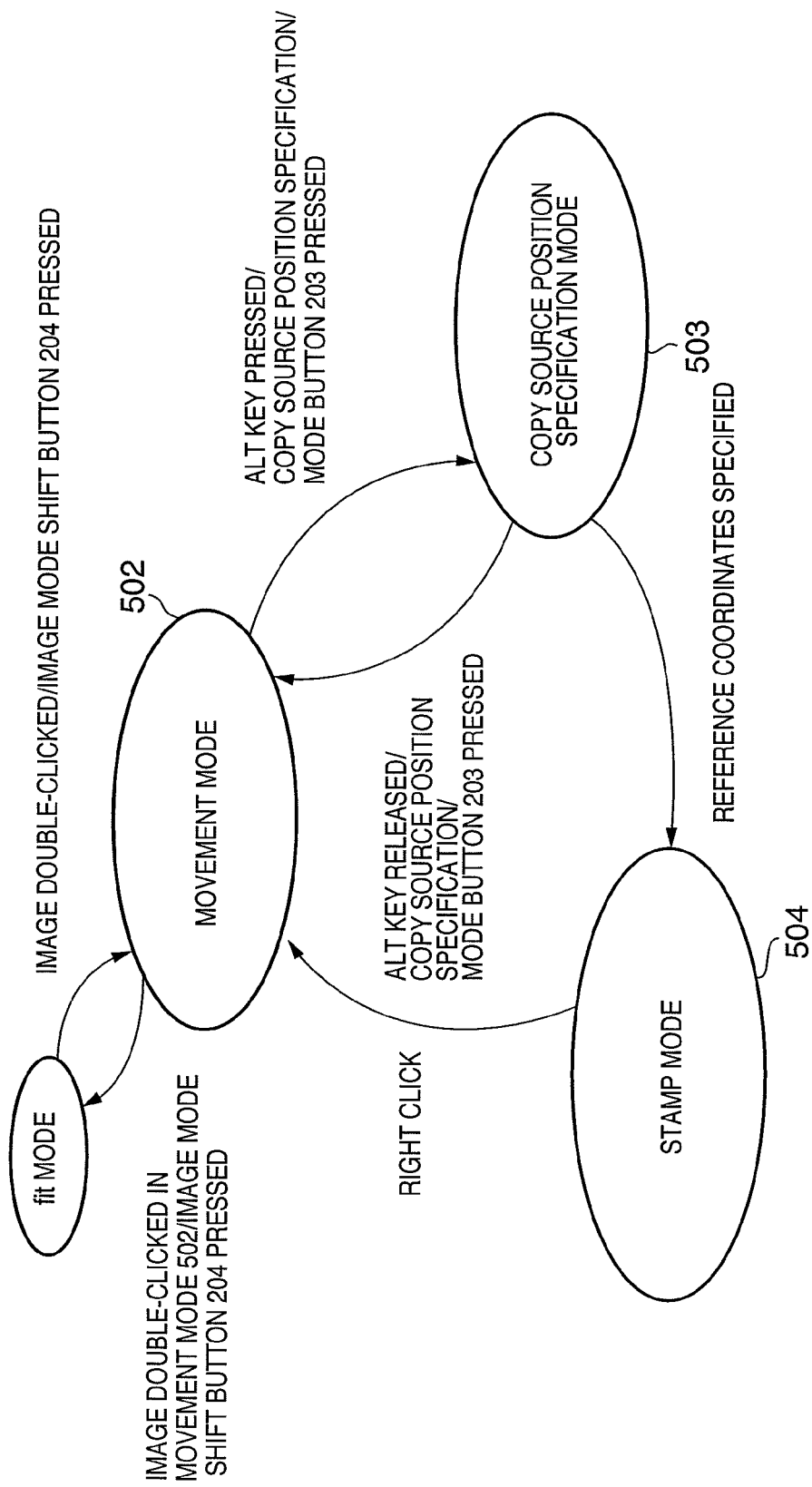
FIG. 5 is a diagram showing a shift between states in a non-scaled mode of the GUI that the image editing apparatus according to the embodiment of the present invention shows.

In the non-scaled mode, the image can be modified. A diagram of a shift between states in the non-scaled mode is shown in FIG. 5. Immediately after a shift from the fit mode to the non-scaled mode comes a movement mode 502. In the movement mode 502 state, if the image is double-clicked or the image mode shift button 204 is pressed, the GUI shifts to the fit mode.

In the movement mode 502, the position of the image display can be changed. As with an ordinary window display, the user can change the position of the image display using the vertical and horizontal scroll bars.

While the Alt key is pressed in the movement mode 502 or in a stamp mode 504, or when the copy source position specification mode button 203 is pressed, the GUT shifts to a copy source position specification mode 503. When the Alt button is released or when the copy source position specification mode 503 is pressed again, the GUI shifts to the movement mode 502. When the display mode shift button 204 is pressed, the GUT shifts to the fit mode 501. If the image is clicked while the GUT is in the copy source position specification mode 503, the GUI shifts to the stamp mode 504 with the clicked position as the copy source coordinates.

After entering the stamp mode 504, area reproduction is carried out on the coordinates first clicked using the left button of the mouse (left-clicked). These coordinates are called the reference coordinates. When the reference coordinates are refreshed, the copy relative coordinates are put into an unset state. The copy relative coordinates are the relative coordinates from the copy destination area to the copy source area of the area reproduction process.

If the right mouse button is clicked while the GUI is in the stamp mode 504, the GUI shifts to the movement mode 502. When the image mode shift button 204 is pressed while the GUI is in the movement mode 502, the GUI returns to the fit mode 501.

Figure 6:
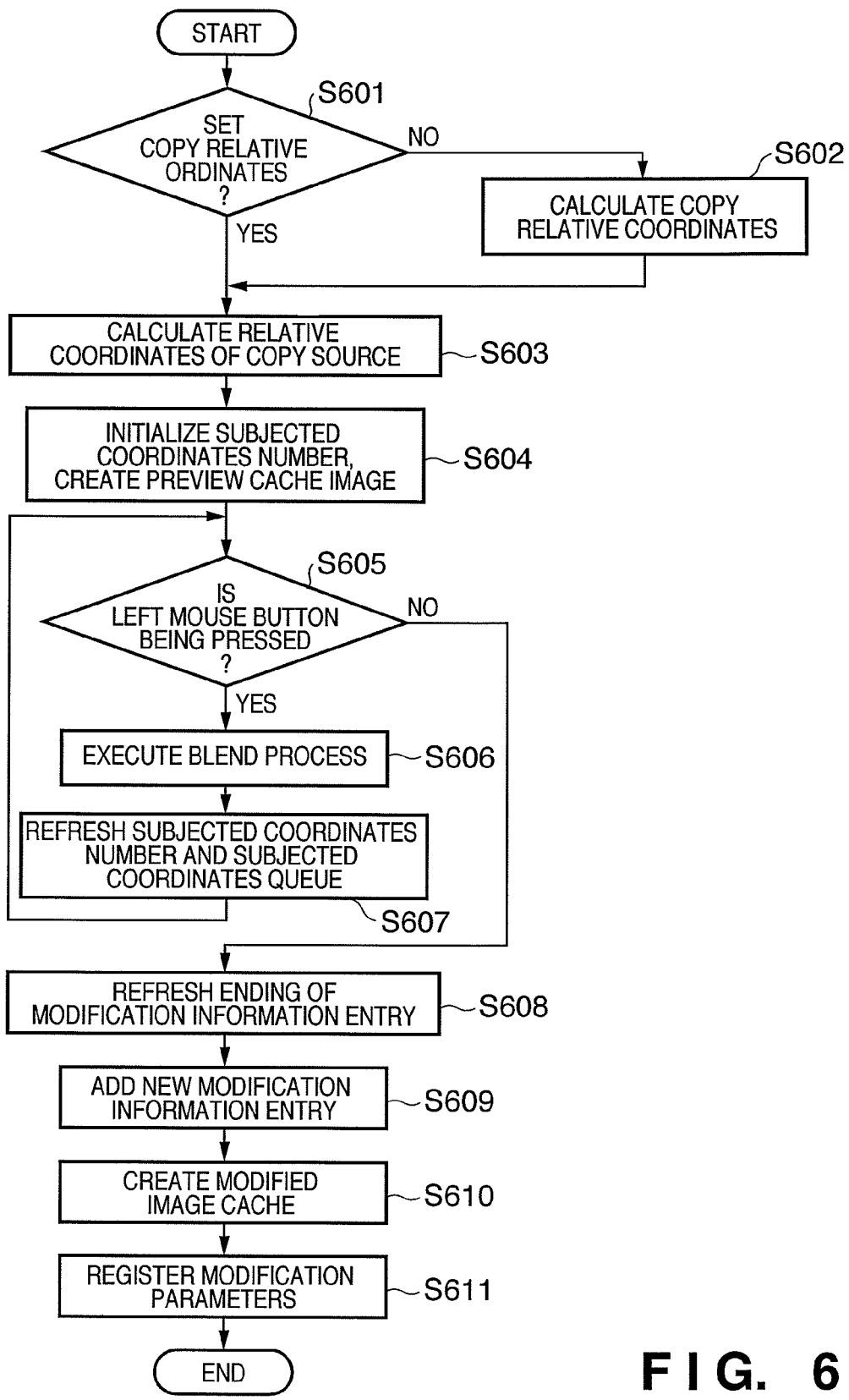
FIG. 6 is a flow chart illustrating the entire area reproduction process of the image editing apparatus according to the embodiment of the present invention.

Next, a description will be given of the steps in the area reproduction process, using the flow chart shown in FIG. 6. A reproduction mask referenced in FIG. 6 is generated according to the state of the radius slider 209. A reproduction mask generation process is executed each time the state of the radius slider 209 changes. The reproduction mask generation process is described later.

(Step S601) The image editing apparatus checks whether or not copy relative coordinates are set. If so, then processing proceeds to step S603. If not, then processing proceeds to step S602.

(Step S602) The image editing apparatus acquires the relative coordinates of from the copy source position to the reference coordinates and uses these as the copy relative coordinates.

(Step S603) The image editing apparatus computes the relative coordinates of the copy source position. If the copy source position is treated as absolute coordinates, the reference coordinates and the relative coordinates of the copy destination coordinates are used. If the copy source position is treated as relative coordinates, the copy relative coordinates are used.

(Step S604) The image editing apparatus initializes the subjected coordinates number to 0 and creates a preview cache image. The preview cache image is a copy of the preview image generated at this time.

(Step S605) The image editing apparatus checks the state of the left button of the mouse. If the left button has been pressed, processing proceeds to step S606. If the left button has not been pressed, processing proceeds to step S608.

(Step S606) The image editing apparatus uses the coordinates that the mouse cursor specifies as the copy destination coordinates and carries out a blend process from the copy relative coordinates using the reproduction mask. Details of the reproduction mask and the blend process are described later.

(Step S607) The image editing apparatus increases the subjected coordinates number by 1 and adds the copy destination coordinates to the subjected coordinates queue. Processing returns to step S605.

(Step S608) The image editing apparatus discards entries ahead of the modification information stack terminus position information.

(Step S609) The image editing apparatus creates a new modification information entry and refreshes the modification information stack terminus position information so as to reference the newly created modification information entry.

(Step S610) The image editing apparatus creates a difference image between the preview cache image created in step S604 and the preview image, and makes this difference image the modified image cache of the modification entry created in step S609. The preview cache is supplied with cache rotation information indicating the direction of rotation at the time the cache was created.

(Step S611) The image editing apparatus registers radius r, copy relative coordinates, subjected coordinates number and subjected coordinates queue as modification parameters for the modification information entry created in step S609. Here, using the image rotation information, the copy relative coordinates and the subjected coordinates queue are converted into coordinates prior to image rotation processing and registered. These processes enable modification to be applied to the correct position consistently even if the direction of rotation of the image is changed.

Next, a detailed description is given of the blend process. The blend process blends the area of radius r centered on the copy source coordinates with the area of radius r centered on the copy destination coordinates. In actuality, if blending is not done in such a way that the ratio of the copy source coordinates is decreased the further away from the copy destination coordinates, the border region between the parts subjected to area reproduction and the parts not subjected to area reproduction becomes conspicuous, and therefore the process is such as to decrease the blend ratio the further away from the copy destination coordinates. Accordingly, blending is carried out over a range that is twice the radius r. A map showing this ratio of blending is called the reproduction mask.

Figure 7:
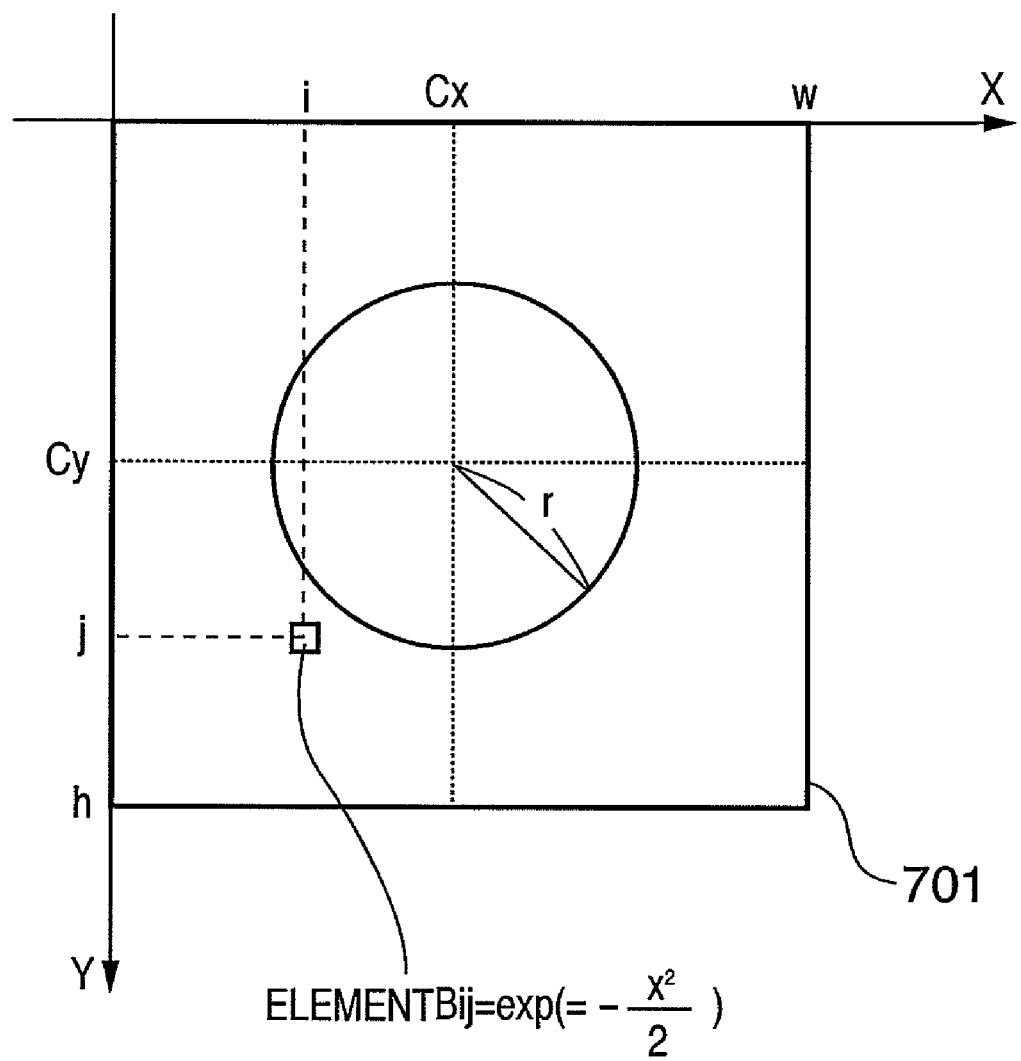
FIG. 7 is a diagram showing the concept of a reproduction mask in the embodiment of the present invention.

First, the concept of a reproduction mask is shown in FIG. 7. The range of the elements of the reproduction mask is [0.0, 1.0]. The larger this value, the greater the priority of the copy source area pixel values. The elements of the reproduction mask are calculated using values themselves calculated according to the distance from the center (Cx, Cy) of the reproduction mask. This method of computation is described later. Where the x coordinates and the y coordinates of the copy source coordinates F and the copy destination coordinates T are given as −2*r and as −2*r, respectively, and the upper left corner of the reproduction mask is the origin, the process of blending a given pixel at coordinates (i,j) acquires the pixel value in accordance with the following formula:

$$T'_{i,j} = B_{i,j} * F_{i,j} + (1.0 - B_{i,j}) * T_{i,j}$$

Here, F is the copy source coordinates pixel, T is the copy destination area pixel, B is the reproduction mask element, and T' is the blended copy destination area pixel. In the present embodiment, the respective ROB values of the pixels are blended according to the blend rate and the blended pixel values calculated.

A description will now be given of processing performed on the path of a mouse pointer during dragging, in a case in which the mouse is dragged in the process shown in FIG. 6. In Windows®, not all the coordinates through which the mouse pointer passes during dragging are reported to the application from the OS, but are instead reported at fixed intervals. However, these intervals are comparatively long. Accordingly, when the application receives a report indicating a drag state, area reproduction is performed at each fixed distance L along a line connecting those coordinates A (xa, ya) and the immediately previously reported coordinates B (xb, yb). Performing this sort of process makes it possible to acquire smooth area reproduction effects.

The interval L between points at which area reproduction is applied during dragging of the mouse is acquired by the following formula using the radius r specified by the radius slider 209:

$$L = \text{floor}(r/B + 0.5)$$

However, where L=0, processing proceeds on the assumption that L=1. Here, floor(x) expresses an integer value of a real number x in which the places after the decimal point have been rounded off. In addition, B is a value acquired through experience. In this embodiment, B=4.7.

Here, a description will now be given of the method of computing the elements of the reproduction mask shown in FIG. 7. The mask elements Bi,j are acquired by the following formula:

$$B_{i,j} = \exp\left(-\frac{x^2}{2}\right) \text{ where } x \text{ is:}$$

$$x = \frac{4\sqrt{(Cx-i)*(Cx-i)*(Cy-j)*(Cy-j)}}{r}$$

Cx, Cy are the center coordinates of the mask shown in FIG. 7. In this embodiment, (Cx,Cy)=(2*r,2*r). Therefore, the reproduction mask size is (4*r+1) elements in width and (4*r+1) elements in height. i,j are coordinate values wherein the upper left corner is (i,j)=(0,0), with the range of i,j being [0,4*r+1]. r is the radius specified by the radius slider 209.

Figure 8:
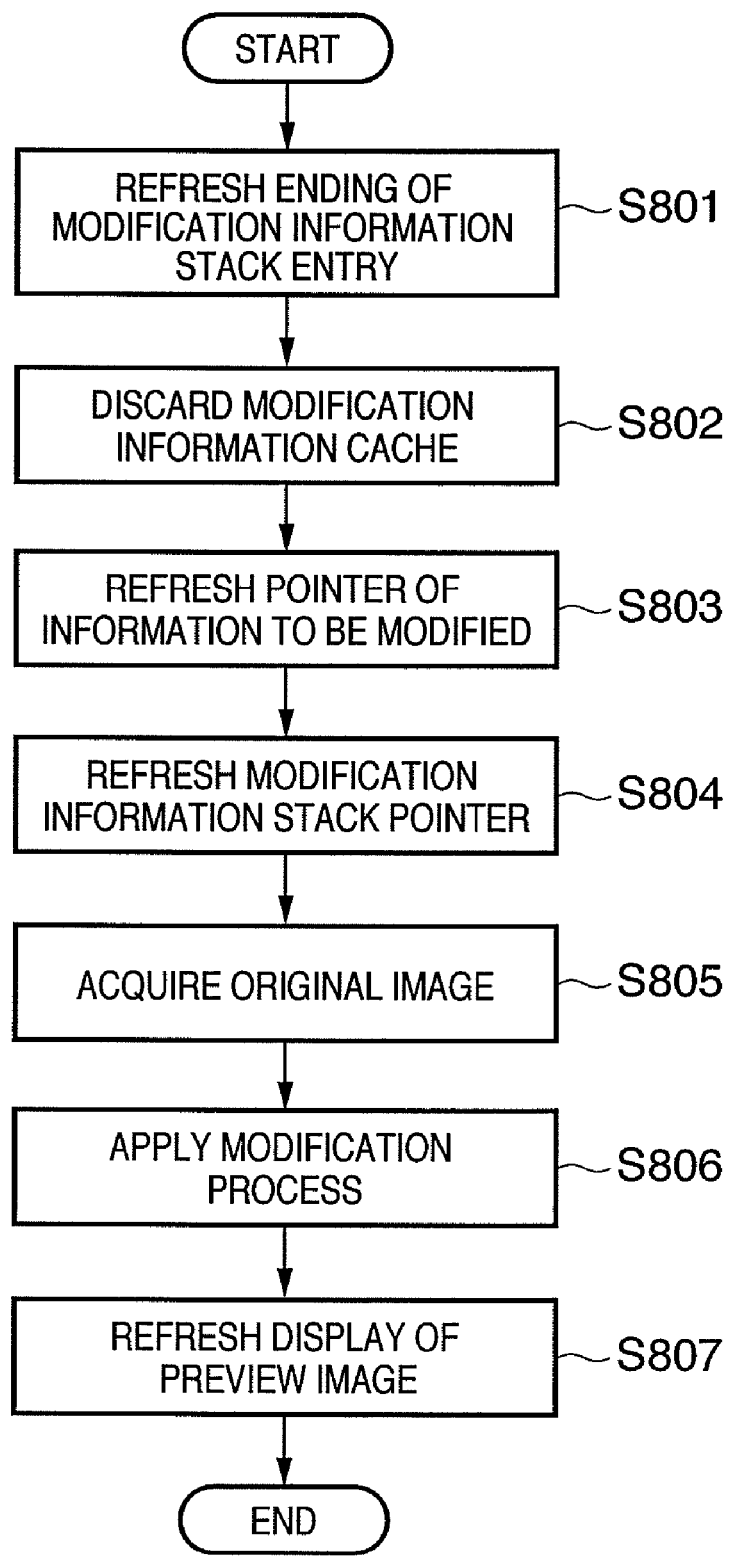
FIG. 8 is a flow chart illustrating a process of switching an image to be modified in an image editing apparatus according to a first embodiment of the present invention.

Next, using the flow chart shown in FIG. 8, a description will be given of a process of switching the image to be modified when the image to be modified has been changed by the specification of an image to be modified file or by the pressing of the previous selection button 210 or the next selection button 211.

(Step S801) With respect to the modification information stack of the image to be modified, modification information entries ahead of the modification information stack terminus information are discarded.

(Step S802) With respect to the modification information stack of the image to be modified, the entire modification information stack modification information cache is discarded.

(Step S803) The information to be modified pointer is refreshed so as to refer to the file entries of the newly selected file.

(Step S804) The reference destination of the modification information stack of the image to be modified is refreshed so as to refer to the modification information stack that the image to be modified pointer references.

(Step S805) The file is decoded and the original image in the image to be modified data is acquired.

(Step S806) The modification process held in the modification information stack is applied to the original image acquired in step S805 to generate a preview image. Details of the modification process will be described later using FIG. 9.

(Step S807) The GUI state shifts to the fit mode 401 and the preview image is fit-displayed.

Next, a description will be given of the Undo/Redo process of the present embodiment.

Undo is a process of deleting a modification just applied. In this embodiment, the Undo process can be implemented by revising the modification information stack terminus position information so as to reference the immediately preceding modification information entry.

Redo is a process of deleting an Undo, that is, a process of doing over again. In this embodiment, the Redo can be implemented by refreshing the modification information stack terminus position information so as to reference the next entry after the modification stack entry currently referenced.

Thus, as described above, by using the modification information entry and the modification information stack terminus position information, the Undo/Redo function can be achieved simply by changing the reference destination of the modification information stack terminus position information. As a result, the modification can be redone as many times as desired if the coordinates where the modification is to be applied are wrong or the modification results are unsatisfactory.

If the Undo/Redo process is selected or if a new image to be modified file is selected, it is necessary to refresh the preview image. Refreshing the preview image involves applying a modification to an original image in accordance with the modification information stack. Below, a description is given of the details of the process of refreshing the preview image using the flow chart shown in FIG. 9. It should be noted that this process is not applied if the modification information stack is empty.

(Step S901) After the current preview image is discarded, the original image is copied, and this copy becomes the preview image. This preview image is rotated in the direction indicated by the image rotation information.

(Step S902) A pointer p is created that indicates the modification information entry that the modification information stack references.

(Step S903) A check is made to determine whether or not a modified image cache is present in the modification information entry indicated by the pointer p. If such a cache is present, processing proceeds to step S904. If such a cache is not present, processing proceeds to step S905.

(Step S904) The image rotation information and the cache rotation information are compared and the difference image is rotated so as to face in the direction of the image indicated by the image rotation information, and the difference is reflected in the preview image. Processing proceeds to step S906.

(Step S905) Using the modification parameters for the modification information entry indicated by the pointer p, a modification process is applied to the preview image. However, before applying the modification, the copy relative coordinates and the coordinates stored in the subjected coordinates queue are rotated in the direction indicated by the image rotation information and the modification applied to the rotated coordinates. After application of the modification process, processing proceeds to step S906.

(Step S906) If there is a next modification information entry, processing proceeds to step S907. If there is no next modification information entry, processing ends.

(Step S907) The pointer is refreshed so that the pointer p references the next modification information entry and processing returns to step S903.

A description will now be given of the save button 206 and the convert button 207 shown in FIG. 2. When the save button 206 is pressed, the modification information stack and the image rotation direction are applied to the image to be modified. Providing this capability enables the modification results to be saved with the original unprocessed image data maintained as is. When the convert button 207 is pressed, image processing according to the modification information stack is applied to the original image data in the image to be modified data file and the image is rotated in accordance with the image rotation information, after which the processed and rotated image is saved as a new file. Applying the modification information stack before the rotation of the image has the advantage of eliminating the need to convert the coordinates in the modification information stack. However, in the present embodiment, in order to consolidate processing, the image is modified according to the modification information stack by the process shown in FIG. 9 after the image has been rotated in accordance with the image rotation information.

Figure 10:
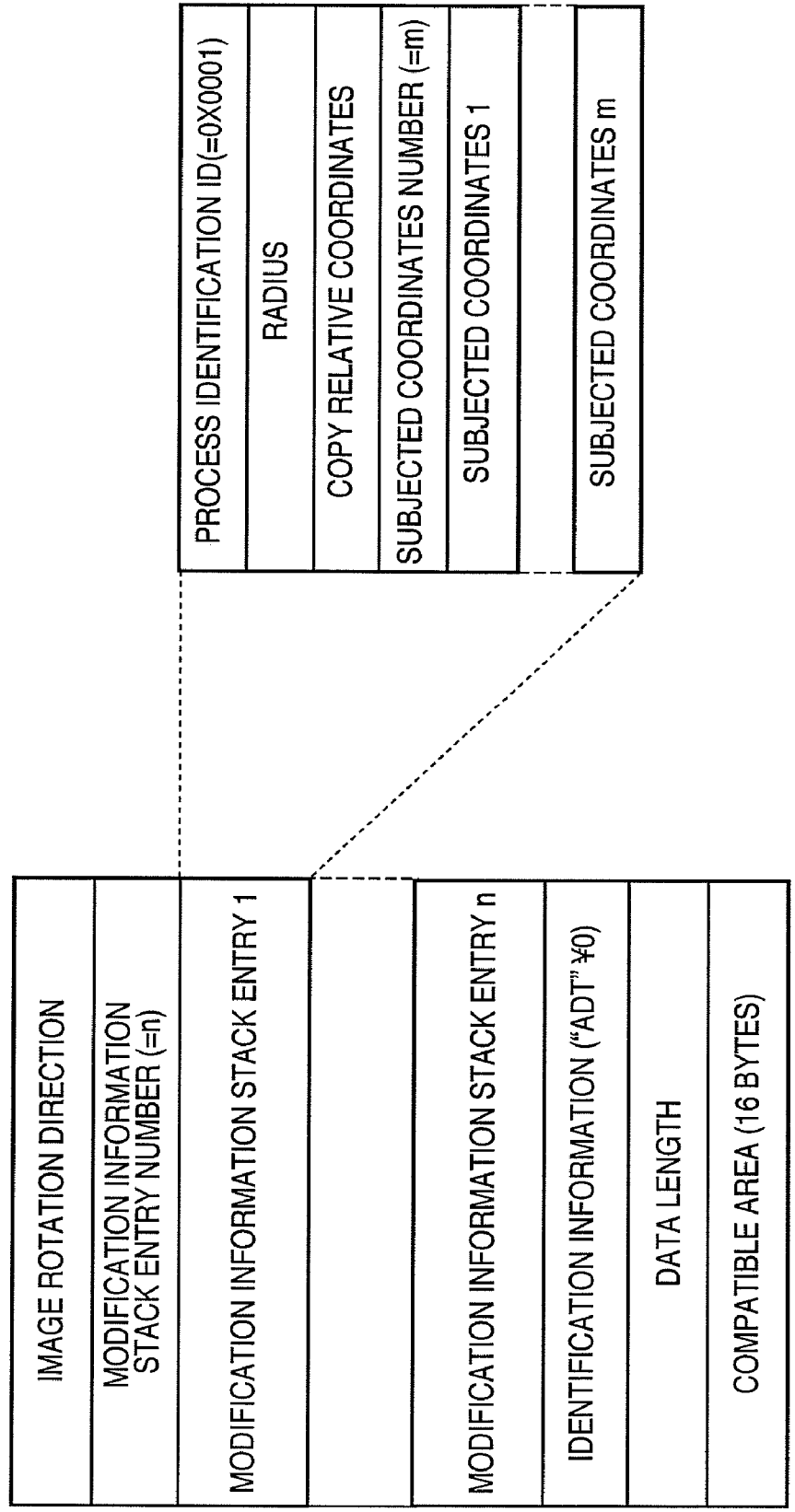
FIG. 10 is a diagram showing the structure of the modification information in the embodiment of the present invention.

An example of the data format supplied by the save button 206 is shown in FIG. 10. The data shown in FIG. 10 is called modification information.

The image rotation direction is contained in 2 bytes, with "0" indicating a state in which the image is not rotated at all, "1" indicating when the image is rotated 90 degrees to the right, "2" when the image is rotated 180 degrees, and "3" when the image is rotated 90 degrees to the left. The modification information stack entry number contains the number of modification information stack entries in 4 bytes. Each modification information stack entry holds a process identification ID, an application radius, subjected coordinates and copy relative coordinates expressed as coordinate values prior to rotation of the image, and the number of subjected coordinates. The coordinates use a total of 4 bytes, 2 bytes for the x coordinate and 2 bytes for the y coordinate, with other numbers accounting for 2 bytes. The process identification ID is provided in order to accommodate future increases in the types of modification processes, and in this embodiment always contains 0x0001.

The modification information can be attached after the JPEG data EOI (End of Image) or at the end of the Tiff data, or at the end of the CCD-RAW data file. However, in some cases, an identification code with a special meaning, for example, a CCD-RAW file identification code, is included at the end of the CCD-RAW data file. As a result, in the 16 bytes at the end of the modification information, a compatible area is provided that copies and records the last 16 bytes of the preceding file that attaches the modification information to the file. Moreover, in order to determine whether or not there is modification information attached to the file, identification information "ADT"¥0 and a data length for detecting the head of the modification data, respectively, are stored in 4 bytes each just before the compatible area.

Figure 11:
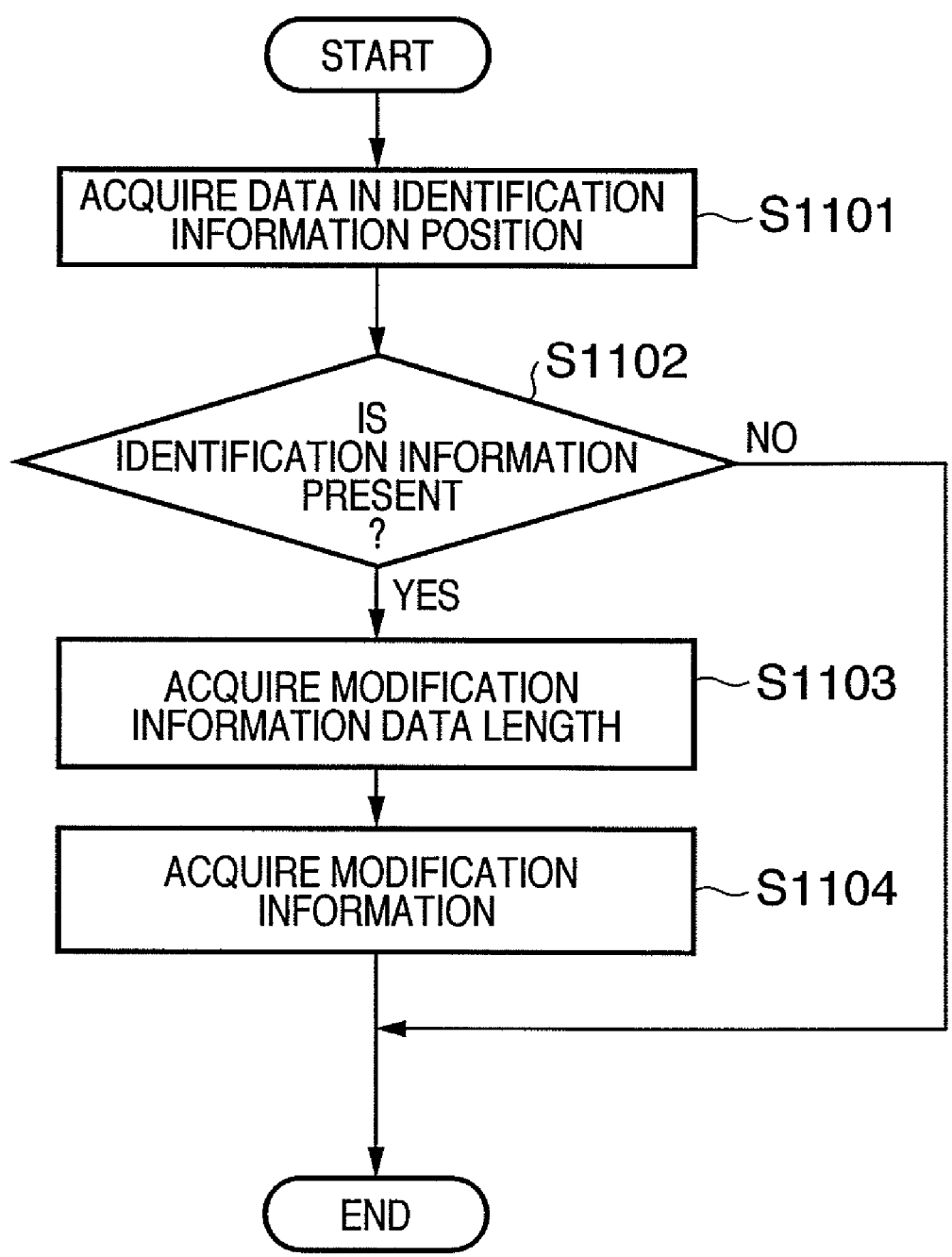
FIG. 11 is a flow chart illustrating a modification information reading process in the embodiment of the present invention.

Next, a description will be given of the process of reading the modification information in the present embodiment, using the flow chart shown in FIG. 11.

(Step S1101) In order to confirm the presence of identification information, first, 4 bytes are read from the position of the $24^{th}$ byte from the end of the file.

(Step S1102) A check is made to determine whether or not the data read in step S1101 is identification information "ADT"¥0 and it is determined whether or not modification information is imparted to the image data. If identification information is detected, then it is determined that modification information is applied and processing proceeds to step S1103. If identification information is not detected, then the reading process ends.

(Step S1103) 4 bytes are read from the position of the $20^{th}$ byte from the end of the file and the data length of the modification information is acquired.

(Step S1104) Data is read starting from a position one modification information data length ahead of the head of the compatible area to the end of the file. The read data is modification information. It should be noted that, if the 16 bytes of the compatible area are added in advance as the data length, data may be read starting from a position one data length ahead of the end of the file.

Thus, as described above, by saving the unmodified image data and the modification to be applied thereto separately, the present invention enables the modification to be applied to the original image data that is the image to be modified without changing the original image data.

In addition, because the modification process is saved at each process step, those modifications that have been made can be deleted in stages and deleted modifications can be re-applied.

Second Embodiment

In this embodiment, a description is given of copying and pasting the modification information stack between different images in the system described in the first embodiment. Where there is a plurality of images that are substantially similar, one image is modified and the same process is performed on the other images, enabling the time spent on the work of modification to be reduced. With the image editing apparatus of the present embodiment, as with the first embodiment, the editing (modification) procedure is kept in a form called a modification information stack, and therefore can achieve the same modification processes by applying just the modification information stack to the other image data files.

First, a description is given of the process of copying the modification information stack. The process of copying the modification information stack involves storing the modification information stack of the image to be modified in a copy buffer secured as the space of, for example, a primary storage device. However, the degree of resolution of the copy source image is required in order to determine whether or not the copied modification information stack is to be pasted, and therefore is retained separately. The information stored in the copy buffer is the modification information stack, the image rotation information, and the image resolution of the original image prior to rotation.

Next, a description is given of the process of pasting the modification information stack. The process of pasting the modification information stack involves attaching the modification information stack held in the copy buffer by the copy process to the image to be modified or causing the image to be modified to reflect that modification information stack.

There are two methods used for the pasting process: Attaching the modification information stack to be pasted to the modification information stack of the image to be modified, and discarding the modification information stack of the image to be modified and replacing it with the modification information stack to be pasted. The present embodiment uses the latter method.

Figure 12:
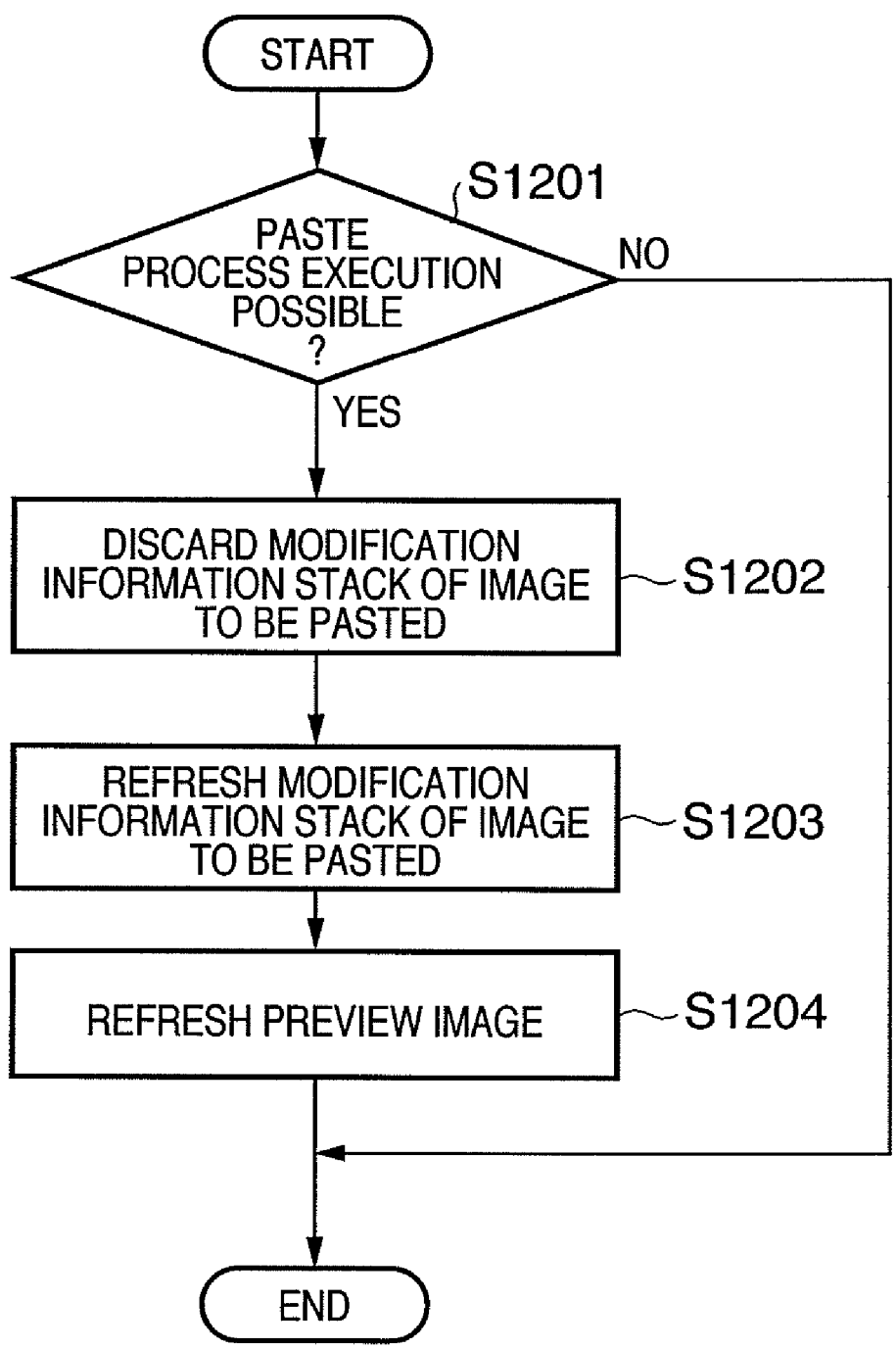
FIG. 12 is a flow chart illustrating a modification information stack paste process in a second embodiment of the present invention.

FIG. 12 shows a flow chart illustrating the paste process of the present embodiment.

(Step S1201) A determination is made whether or not to carry out the process of pasting. In the present embodiment, the resolution of the original image prior to rotation that is stored in the copy buffer and the resolution of the paste destination image prior to rotation are compared, and only when the width and height of the images match is it deemed possible to execute the paste process. If the paste process cannot be executed, then processing ends. If the paste process can be executed, then processing proceeds to step S1202.

(Step S1202) The modification information stack in the data file of the paste destination image is discarded.

(Step S1203) The modification information stack in the copy buffer is copied and used to replace the modification information stack of the paste destination image, thereby refreshing the modification information stack.

Figure 9:
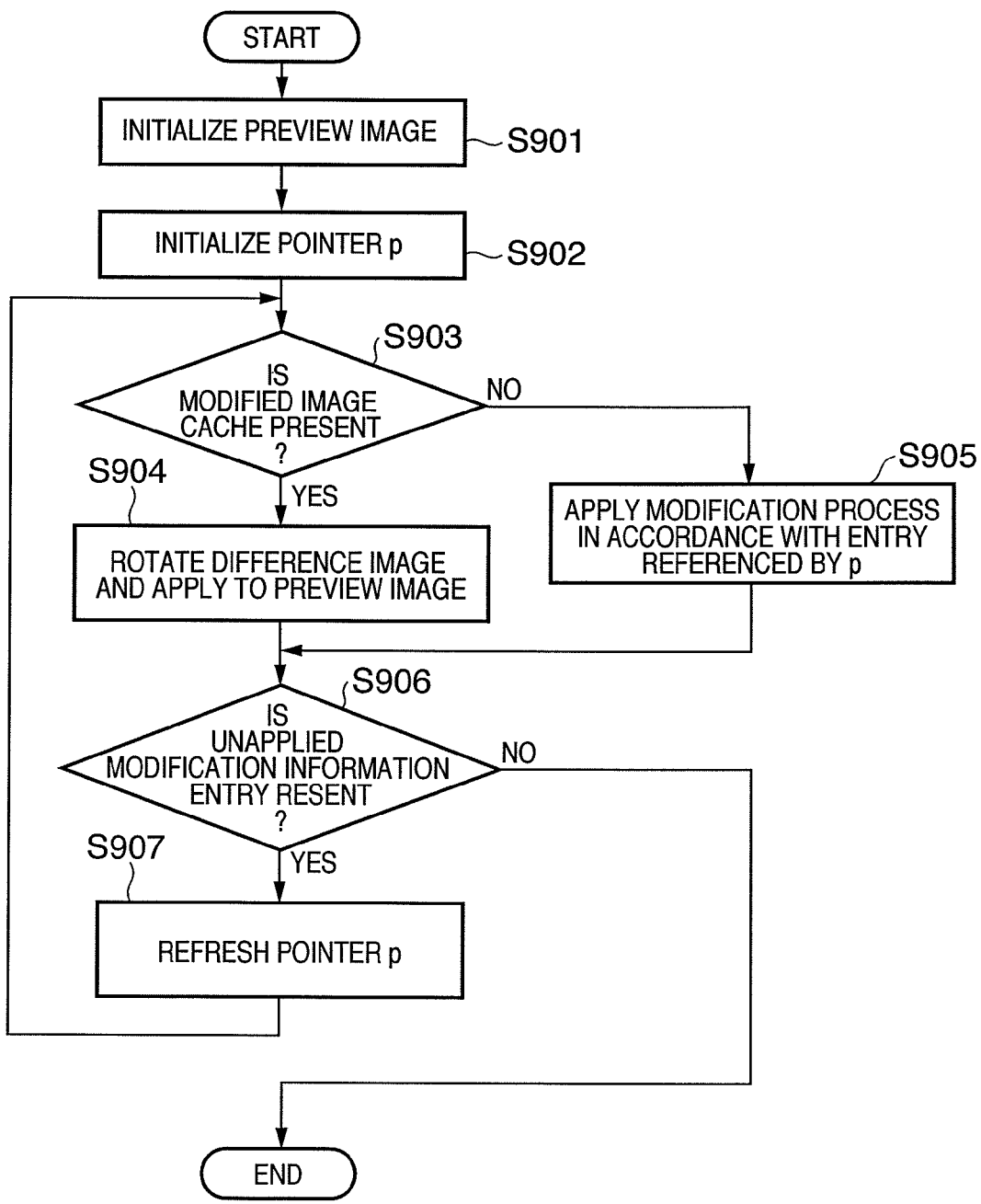
FIG. 9 is a flow chart illustrating a process of applying a modification information stack in the embodiment of the present invention.

(Step S1203) Using the refreshed modification information stack, the modification process shown in FIG. 9 is executed on the paste destination image, the preview image and the modification image cache are reconfigured, and processing ends.

Thus, as described above, by applying the modification information stack to the other image data files, the present embodiment enables the same image modification process to be implemented for multiple images. Therefore, when applying the same process to a plurality of similar images, performing the modification process for any single image allows the modification information stack to be copied and pasted to the remaining images, which is convenient and easy.

Third Embodiment

In the second embodiment described above, execution of the paste process is deemed possible only when the resolution of the copy source image of the modification information stack and the resolution of the image that the user is attempting to paste match. However, among the latest digital cameras are some that simultaneously produce multiple image data of exactly the same image that differ only in their resolution. A determination like that performed in the second embodiment cannot accommodate the same usage of the modification information stack among this sort of plurality of images.

Accordingly, in this embodiment, this sort of joint usage of the modification information stack among multiple images is achieved by changing the coordinates in the modification information depending on the resolution of the image to which the modification information stack is to be pasted. However, it should be noted that, with images with different aspect ratios (the ratio of height to width) the images can sometimes be cut out, and therefore in the present embodiment such images are not subject to pasting.

Figure 13:
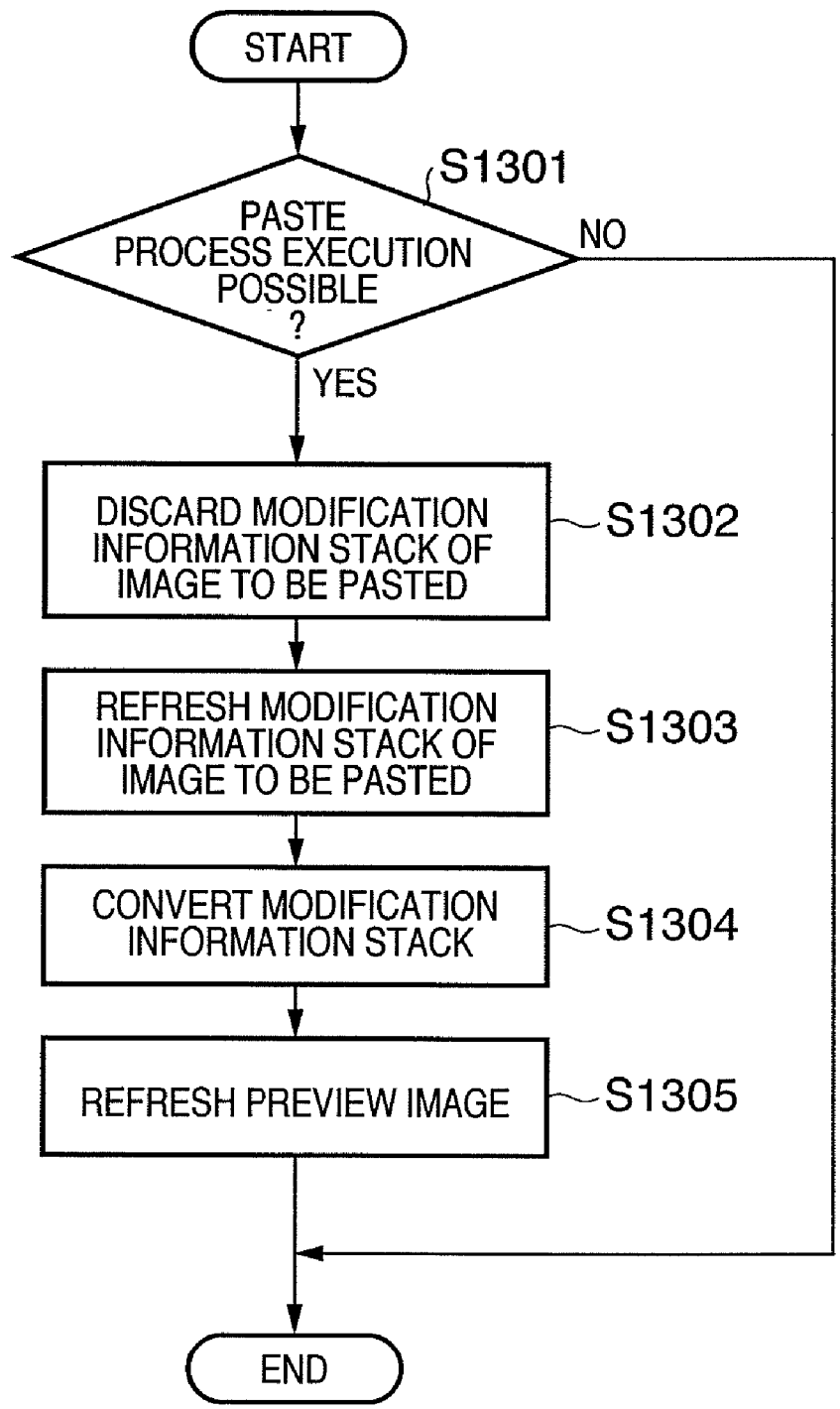
FIG. 13 is a flow chart illustrating a modification information stack paste process in a third embodiment of the present invention.

A description will now be given of the paste process of the present embodiment, based on the flow chart shown in FIG. 13.

(Step S1301) A determination is made whether or not to carry out the process of pasting. In the present embodiment, the resolution of the original image prior to rotation stored in the copy buffer and the resolution of the paste destination image prior to rotation are compared and the paste is executed only if the aspect ratios of the images substantially match. A perfect match is not a condition because even the same images, when reduced, sometimes have aspect ratios that do not match perfectly. Accordingly, the images are deemed to match if the difference between their aspect ratios is within a previously determined range. If it is determined that the pasting process cannot be executed, then processing ends. If it is determined that pasting can be executed, the processing proceeds to step S1302.

(Step S1302) The modification information stack of the data file of the paste destination image is discarded.

(Step S1303) The modification information stack of the original image stored in the copy buffer is copied and used to replace the modification information stack of the paste destination image.

(Step S1304) Using the resolution of the copy original image and the resolution of the paste destination image, the coordinates included in the modification information stack of the paste destination image are converted. Where the resolution of the copy source coordinates is Wc, its height is Hc, the resolution of the paste destination image is Wp and its height is Hp, the coordinates (X,Y) held in the modification information stack become the coordinates (X',Y') after conversion as follows:

$$X'=X*Wp/Wc$$

$$Y'=Y*Hp/Hc$$

In addition, where r is the radius prior to conversion and r' is the radius after conversion, the radius used in the image processing is converted using the following formulas:

$$r' = \left\{ \begin{array}{l} r*Wp/Wc \text{(where } Wc \geq Hc) \\ r*Hp/Hc \text{(where } Wc < Hc) \end{array} \right\}$$

(Step S1305) Using the post-conversion modification information stack, the modification process shown in FIG. 9 is performed on the paste destination image, the preview image and the modified image cache are reconfigured, and processing ends.

Thus, as described above, by converting the coordinates included in modification information stack based on the resolutions of the copy source image and the paste destination image, the present embodiment enables joint usage of the same modification information stack between identical images of different resolutions.

Fourth Embodiment

The present embodiment concerns a printing process of the image editing apparatus described in the first embodiment.

When printing the modified image, in general, the modification contained in the modification information stack is applied to the original image, after which the image is converted to a printing resolution and output to the printer. However, as described above, in the image modification process, and in particular in the area reproduction process, the smaller the area of application the faster the speed with which processing can be executed.

Accordingly, where the output resolution is smaller than the resolution of the image, the image is first reduced to fit the output resolution, the information in the modification information stack is converted to match the output resolution, and the converted modification information stack process is applied to the reduced image. This conversion process is the same as the process of making the reduced image the paste destination image in the processing described in the third embodiment, and therefore a detailed description thereof is omitted here.

Performing such processing enables faster print output to be obtained even in instances in which complicated modifications are applied.

Fifth Embodiment

In the first embodiment, the display mode is returned to the fit mode when the data file of the image to be modified is specified or when the image to be modified is changed by pressing the previous selection button 210 or the next selection button 211. In the present embodiment, unlike the first embodiment, the display mode is maintained as is so as to display an appropriate area.

In the first embodiment, a description is given of display modes of a GUI when a dust reduction process in an instance in which dust adhering to an image sensor appears in the sensed image data is implemented by an area reproduction process.

It is known that, although it sometimes moves slightly from the impact of the operation of the shutter, there is a strong possibility that the dust on the image sensor appears at substantially the same location on image data sensed continuously. Accordingly, in the present embodiment, by switching the display image while maintaining the coordinates of the image prior to rotation, a position is displayed such that the same dust as displayed previously is displayed even after switching to other images, without forcibly returning once to the fit mode. Providing this type of image switching method enables the work of editing the image to be carried out while noting the presence of dust at the same position among a plurality of images.

Figure 14:
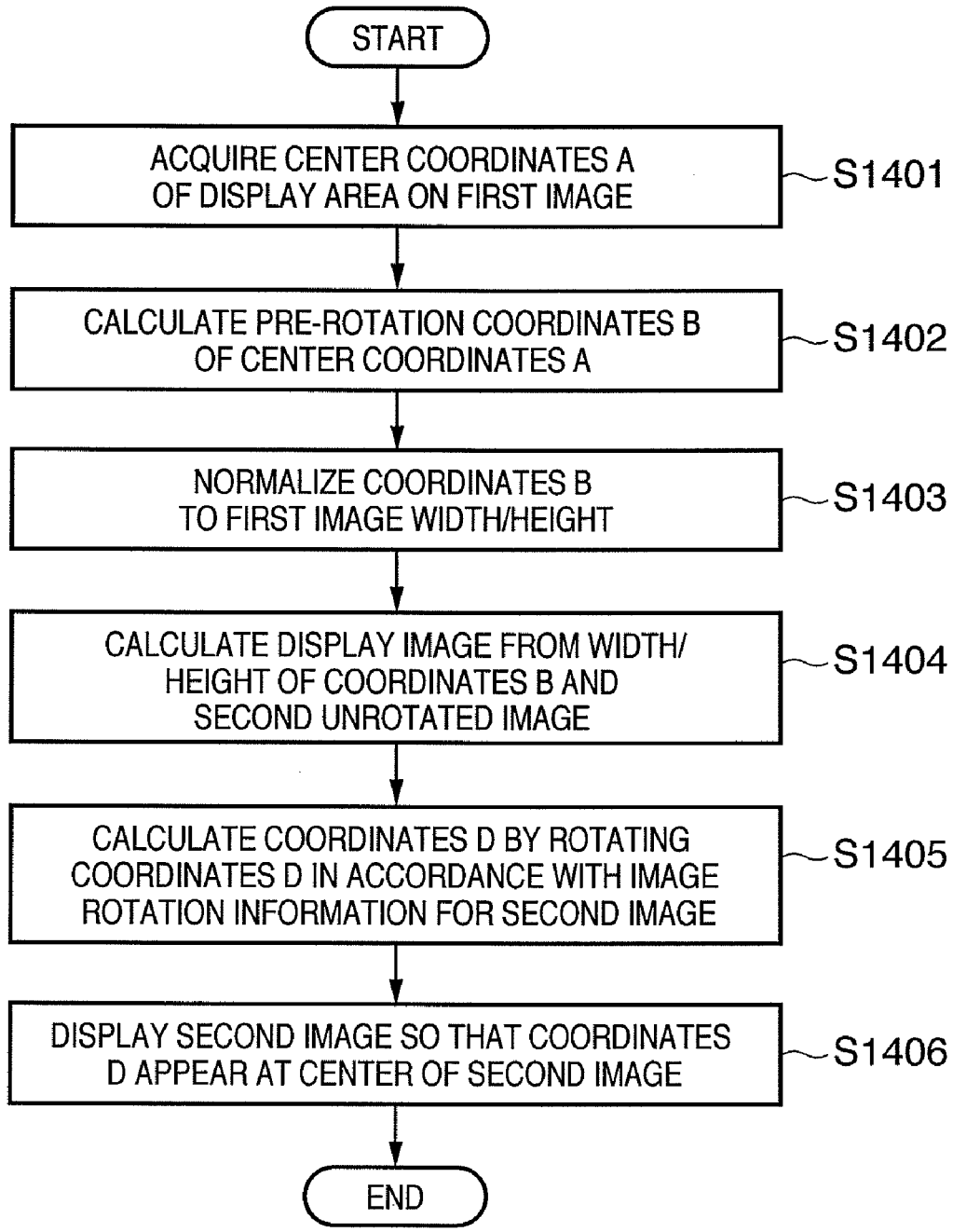
FIG. 14 is a flow chart illustrating a process of switching the image to be edited in a fifth embodiment of the present invention.

A description is now given of the processes performed when changing the image to be modified in the present embodiment, using the flow chart shown in FIG. 14. It should be noted that the process of changing the image to be modified in the fit mode 401 state is the same as that carried out in the first embodiment. In the following description, the image to be modified that has been selected up to this point is called a first image, and the image that is newly selected or specified is called the second image. The first image and the second image are assumed to have been rotated in accordance with the image rotation information. These images prior to rotation are called the first unrotated image and the second unrotated image, respectively.

(Step S1401) Within the first image, the center coordinates A (XA,YA) of a partial area displayed in the non-scaled mode are acquired. The center coordinates A here are not the coordinates of the display area but the coordinates of the first image as a whole.

(Step S1402) Using the image rotation information of the first image, coordinates B (XB, YB) corresponding to the center coordinates A on the first unrotated image are calculated. These coordinates can be calculated by rotating the center coordinates A (XA,YA) in a direction that cancels the direction of rotation indicated by the image rotation information.

(Step S1403) The coordinates B (XB,YB) are normalized using the formula below. W1 and H1 are the width and the height, respectively, of the first unrotated image. The normalized coordinates are (X'B,Y'B).

$$X'B=XB/W1$$

$$Y'B=YB/H1$$

(Step S1404) Using the width W2 and the height H2 of the second unrotated image, center coordinates C (XC,YC) corresponding to the coordinates X'B,Y'B in the second unrotated image are calculated.

$$XC=W2*X'B$$

$$YC=H2*Y'B$$

(Step S1405) Coordinates D (XD,YD) representing the center coordinates C rotated in accordance with the image rotation information of the second image are acquired.

(Step S1406) The partial area of the second image is displayed in non-scaled mode so that the coordinates D(XD,YD) appear in the center of the image display area 201.

By performing these processes, the image to be modified can be switched while maintaining a relative position on the unrotated image as is. Therefore, assuming that a plurality of images sensed by the same camera are switched, substantially the same position on the image sensor is always displayed in the center of the display area regardless of the direction of rotation of the images, with a strong possibility of being able to remove dust efficiently. Moreover, since there is no return of the display to the fit mode, there is no need to perform an operation to shift to the non-scaled mode with each switching of the image, improving efficiency in this respect as well.

Other Embodiments

It should be noted that the invention also includes a case in which the same functions as those of the present invention are achieved by supplying a software program that implements the functions of the foregoing embodiments directly or indirectly, or by using wire/wireless communications, to a system or apparatus having a computer capable of executing the program, with the computer of the system or apparatus then executing the program thus supplied.

Accordingly, since a computer implements the processing functions of the present invention, the program code supplied to and installed in the computer itself also achieves the present invention. In other words, the computer program for implementing the functional processes of the invention is itself also within the scope of the present invention.

In that case, so long as the system or apparatus has the functions of the program, the program may be executed in any form, such as an object code, a program executed by an interpreter, or script data supplied to an operating system.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network, and the program data file is downloaded to a connected client computer. In this case, the program data file may be divided into a plurality of segment files and the segment files distributed among different servers.

In other words, a server device that downloads, to multiple users, the program data files for implementing the functional processes of the present invention by computer, is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by a computer executing the read program, an operating system or the like running on the computer may perform all or a part of the actual processing based on the instructions of that program, so that the functions of the foregoing embodiments can be implemented by this processing.

Furthermore, after the program read from the storage medium is written to a function expansion board inserted in the computer or to a memory provided in a function expansion unit connected to the computer, a CPU or the like mounted on the function expansion board or function expansion unit may perform all or a part of the actual processing, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-021826 filed on Jan. 28, 2005, which is hereby incorporated by reference herein in its entirety.

What is claimed is:

1. An image editing apparatus capable of applying a modification process specified by a user to original image data, the image editing apparatus comprising:
   image processing means that applies the modification process to the original image data and outputs modified image data;
   display means that displays the image data that the image processing means outputs as a result of the modification process;
   process step information storage means that stores process step information that expresses an order and content of the modification process applied to the original image data with each application of the modification process; and
   save means that saves the original image data as well as data containing the process step information relating to the original image data as modified image data,
   wherein the display means provides a non-scaled display of a partial area of image data output by the image processing means, and, when switching to display another image, provides non-scaled display of an area of the other image data that corresponds to the partial area.

2. The image editing apparatus according to claim 1, further comprising control means that controls the image processing means so as to undo the last applied modification process based on the corresponding process step information when there is a modification process undo instruction for the modified image data, and to execute a succeeding modification process after a last applied modification process based on the corresponding process step information when there is a modification process redo instruction.

3. The image editing apparatus according to claim 1, wherein:
   the save means inserts rotation information indicating a degree of rotation of the original image data in the modified image data; and
   the image processing means applies a rotation process to the original image data based on the rotation information.

4. The image editing apparatus according to claim 1, wherein difference image data between an image prior to application of the corresponding modification process and the image after application of the corresponding modification process is included in each piece of the process step information.

5. The image editing apparatus according to claim 1, wherein, when the image processing means generates a modified image of lower resolution than the original image, the image processing means applies the modification process after reducing the resolution of the original image.

6. A computer-readable storage medium storing a program that causes a computer to function as the image editing apparatus according to claim 1.

7. The image editing apparatus according to claim 1, wherein the modification process is an area reproduction process which reproduces a copy source area in the original image data and copies the reproduced area image on a copy destination area in the original image.

8. The image editing apparatus according to claim 7, wherein the area reproduction process copies the reproduced area image on the copy destination area by blending pixels in the reproduced area image and the copy destination area, with a blending ratio of pixels in the reproduced area image decreasing as a distance from the center of the copy destination area increases.

9. An image editing apparatus comprising:
   read-out means that reads out process step information from first image data that includes original image data and the process step information expressing an order and content of a modification process applied to the original image data; and
   attaching means that attaches the read-out process step information to second image data to which the same modification process as applied to the first image data is to be applied as process step information relating to the second image data,
   wherein the attaching means executes attachment of the process step information only when the resolutions of the first image data and the second image data match.

10. A computer-readable storage medium storing a program that causes a computer to function as the image editing apparatus according to claim 9.

11. The image editing apparatus according to claim 9, wherein the modification process is an area reproduction process which reproduces a copy source area in the original image data and copies the reproduced area image on a copy destination area in the original image.

12. The image editing apparatus according to claim 11, wherein the area reproduction process copies the reproduced area image on the copy destination area by blending pixels in the reproduced area image and the copy destination area, with a blending ratio of pixels in the reproduced area image decreasing as a distance from the center of the copy destination area increases.

13. An image editing apparatus comprising:
   read-out means that reads out process step information from first image data that includes original image data and the process step information expressing an order and content of a modification process applied to the original image data;
   attaching means that attaches the read-out process step information to second image data to which the same modification process as applied to the first image data is to be applied as process step information relating to the second image data; and
   coordinate conversion means that converts coordinate information included in the attached process step information to match the resolution of the second image data when the resolutions of the first image data and the second image data differ and their aspect ratios match.

14. A computer-readable storage medium storing a program that causes a computer to function as the image editing apparatus according to claim 13.

15. The image editing apparatus according to claim 13, wherein the modification process is an area reproduction process which reproduces a copy source area in the original image data and copies the reproduced area image on a copy destination area in the original image.

16. The image editing apparatus according to claim 15, wherein the area reproduction process copies the reproduced area image on the copy destination area by blending pixels in the reproduced area image and the copy destination area, with a blending ratio of pixels in the reproduced area image decreasing as a distance from the center of the copy destination area increases.

17. An image editing method capable of applying a modification process specified by a user to original image data, the image editing method comprising:

an image processing step using a processor to apply the modification process to the original image data and outputting modified image data;

a display step of displaying the image data that the image processing step outputs as a result of the modification process;

a process step information storage step of storing process step information that expresses an order and content of the modification process applied to the original image data with each application of the modification process; and a save step of saving the original image data as well as data containing the process step information relating to the original image data as modified image data, wherein the display step provides a non-scaled display of a partial area of image data output by the image processing step, and, when switching to display another image, provides non-scaled display of an area of the other image data that corresponds to the partial area.

18. An image editing method comprising:

a read-out step of reading out process step information from first image data that includes original image data and the process step information expressing an order and content of a modification process applied to the original image data; and an attaching step using a processor to attach the read-out process step information to second image data to which the same modification process as applied to the first image data is to be applied as process step information relating to the second image data, wherein the attaching step executes attachment of the process step information only when the resolutions of the first image data and the second image data match.

19. An image editing method comprising:

a read-out step of reading out process step information from first image data that includes original image data and the process step information expressing an order and content of a modification process applied to the original image data;

an attaching step using a processor to attach the read-out process step information to second image data to which the same modification process as applied to the first image data is to be applied as process step information relating to the second image data; and a coordinate conversion step of converting coordinate information included in the attached process step information to match the resolution of the second image data when the resolutions of the first image data and the second image data differ and their aspect ratios match.

* * * * *